US010472926B2

United States Patent
Park et al.

(10) Patent No.: US 10,472,926 B2
(45) Date of Patent: Nov. 12, 2019

(54) PRESSURIZED SEAT CHECK VALVE

(71) Applicants: Do Seo Park, Houston, TX (US); Marc Samuelson, Houston, TX (US); Zhi Yong He, Cypress, TX (US); Gregory Armstrong, Houston, TX (US); Donavan Holland Brown, Houston, TX (US)

(72) Inventors: Do Seo Park, Houston, TX (US); Marc Samuelson, Houston, TX (US); Zhi Yong He, Cypress, TX (US); Gregory Armstrong, Houston, TX (US); Donavan Holland Brown, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 15/622,107

(22) Filed: Jun. 14, 2017

(65) Prior Publication Data
US 2018/0363416 A1   Dec. 20, 2018

(51) Int. Cl.
| | |
|---|---|
| *E21B 34/08* | (2006.01) |
| *F16K 15/04* | (2006.01) |
| *F16K 15/02* | (2006.01) |
| *F16K 25/00* | (2006.01) |
| *F16K 25/04* | (2006.01) |
| *F16K 31/122* | (2006.01) |

(52) U.S. Cl.
CPC ............ *E21B 34/08* (2013.01); *F16K 15/026* (2013.01); *F16K 15/044* (2013.01); *F16K 25/005* (2013.01); *F16K 25/04* (2013.01); *F16K 31/1221* (2013.01)

(58) Field of Classification Search
CPC ........ F16K 3/207; F16K 15/04; F16K 15/044; F16K 25/00; F16K 17/0406; F16K 17/0466; F16K 5/205; F16K 15/14; F16K 15/144; E21B 34/08
USPC ........................................................ 251/172
See application file for complete search history.

(56) References Cited

U.S. PATENT DOCUMENTS

| | | | | |
|---|---|---|---|---|
| 987,719 | A * | 3/1911 | Hayden ................... | F16K 15/04 137/533.11 |
| 2,676,782 | A * | 4/1954 | Bostock ................... | F16K 1/14 137/467 |
| 2,829,719 | A * | 4/1958 | Clark, Jr. ................. | E21B 21/10 137/269 |

(Continued)

FOREIGN PATENT DOCUMENTS

GB         972053  A  * 10/1964  ........... F16K 15/044

OTHER PUBLICATIONS

Notification of Transmittal of the International Search Report and the Written Opinion of the International Searching Authority, or the Declaration; PCT/US2018/031933; dated Nov. 13, 2018; 8 pages.

*Primary Examiner* — Reinaldo Sanchez-Medina
*Assistant Examiner* — Nicole Gardner
(74) *Attorney, Agent, or Firm* — Cantor Colburn LLP

(57) ABSTRACT

A pressurized seat check valve including a flexible frusto-conical seat having a back surface configured for exposure to upstream pressure, a closure member in sealable communication with the seat, the closure member being biased into contact with the seat and, in use, the seat being deflected toward the closure member by the exposure to upstream pressure.

12 Claims, 3 Drawing Sheets

(56) References Cited

U.S. PATENT DOCUMENTS

| | | | |
|---|---|---|---|
| 3,776,258 A * | 12/1973 | Dockins, Jr. | E21B 21/10 137/269 |
| 4,446,886 A | 5/1984 | Taylor et al. | |
| 5,146,992 A * | 9/1992 | Baugh | E21B 23/08 166/154 |
| 5,522,346 A * | 6/1996 | Clark, IV | A01K 39/0213 119/72.5 |
| 5,725,013 A * | 3/1998 | Premiski | F16D 25/14 137/454.2 |
| 5,960,881 A * | 10/1999 | Allamon | E21B 21/103 166/285 |
| 8,668,006 B2 * | 3/2014 | Xu | E21B 33/12 166/192 |
| 2004/0069351 A1 * | 4/2004 | Yu | F16K 15/044 137/538 |
| 2005/0126638 A1 | 6/2005 | Gilbert | |
| 2005/0217730 A1 | 10/2005 | Doutt | |
| 2008/0066924 A1 * | 3/2008 | Xu | E21B 34/14 166/376 |
| 2009/0044955 A1 * | 2/2009 | King | E21B 34/14 166/374 |
| 2009/0308614 A1 * | 12/2009 | Sanchez | E21B 34/14 166/328 |
| 2012/0006563 A1 | 1/2012 | Patel et al. | |
| 2012/0227837 A1 | 9/2012 | Lee | |
| 2012/0227840 A1 * | 9/2012 | Lee | B60T 17/04 137/539 |

\* cited by examiner

PRESSURIZED SEAT CHECK VALVE

BACKGROUND

Check valves generally employ a spring to maintain a closure member in sealing communication with a seat. The closure member stays in such position unless fluid pressure applied to the closure member ("cracking pressure") exceeds the spring force applied by the spring. These systems have been employed in many industries for many years and work well under normally experienced conditions. In very high pressure conditions however, it is sometimes necessary to greatly increase the cracking pressure with springs that provide a spring force that is quite high. Resultingly, the contact pressure between the closure member and the seat is quite high and tends to cause greater wear at that interface. While the systems still work and hence are ubiquitously used including in high cracking pressure applications some industries, at least, that often toil in high pressure and high temperature environments requiring high cracking pressures would well receive solutions that reduce maintenance concerns for valves of this sort. One such industry is the hydrocarbon recovery industry since with deeper wells comes higher temperatures and higher pressures and often therefore the requirements of higher cracking pressures.

SUMMARY

A pressurized seat check valve including a flexible frustoconical seat having a back surface configured for exposure to upstream pressure, a closure member in sealable communication with the seat, the closure member being biased into contact with the seat and, in use, the seat being deflected toward the closure member by the exposure to upstream pressure.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

DETAILED DESCRIPTION

Figure 1:
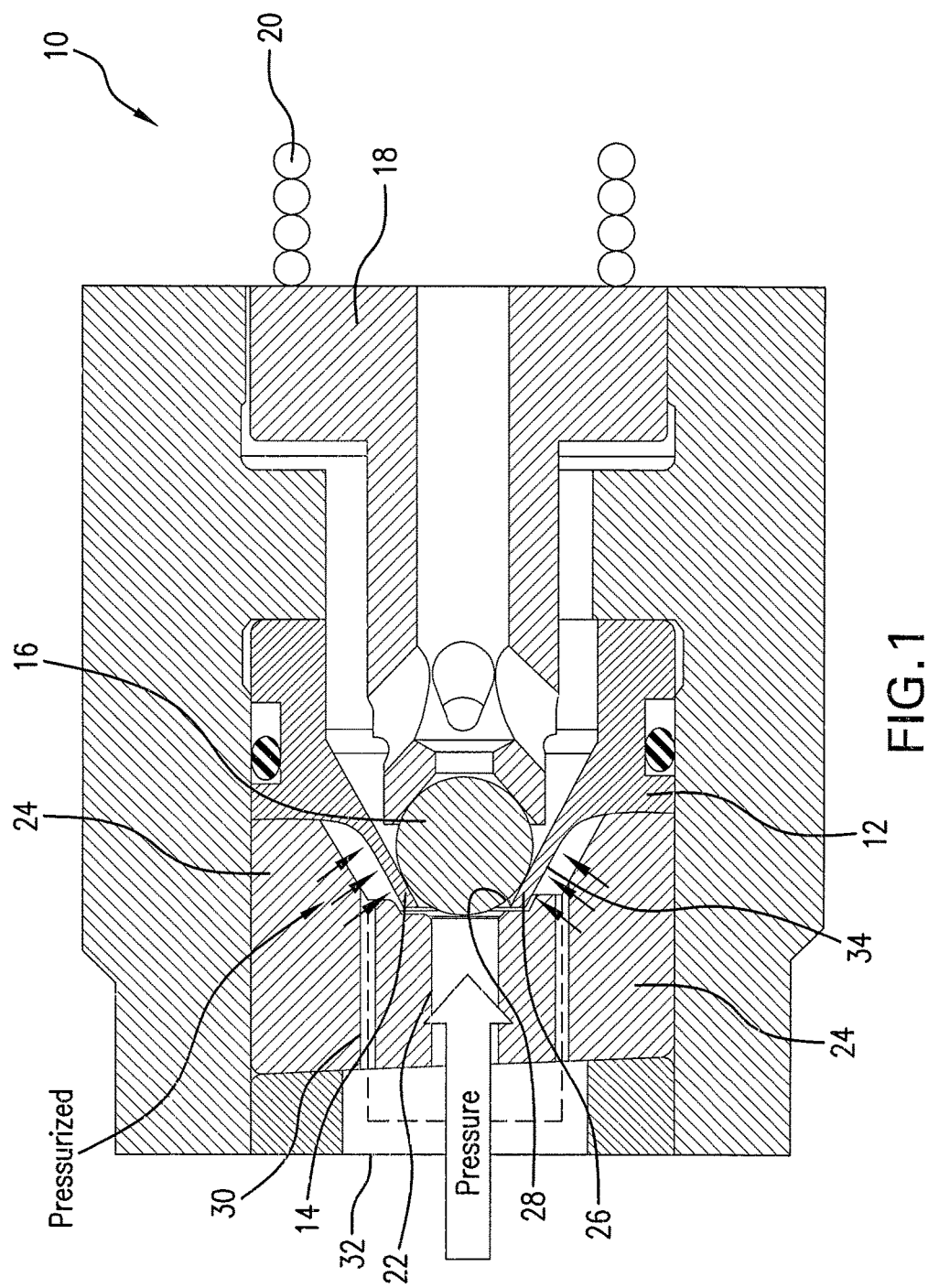
FIG. 1 is a cross sectional view of an embodiment of a pressurized seat check valve as disclosed herein.

Referring to FIG. 1, an embodiment of a pressurized seat check valve 10 is illustrated. The valve 10 includes a seal sub 12, that in some iterations is metal thought other materials may also be employed. The seal sub 12 includes a seat 14. Disposed in sealing relationship with the seat 14 in this figure is a closure member 16 of a dart 18. The closure member 16 may be a part of the dart 18 or a separate piece in communication with the dart 18 but the closure member 16 will be biased into contact with the seat 14, that biasing in iterations through the dart 18 via a spring 20.

In this embodiment pressure from upstream is communicated to the closure member 16 through a bore 22 in a seal adapter 24 positioned adjacent the seal sub 12.

Returning to the seat 14, it is to be understood that the seat 14 is structured as a thin walled member having a frustoconical shape. The seat may be constructed of metal, or mono or polymeric materials, for example. The wall thickness of seat 14 is selected, depending upon the material used, to allow deflection of the seat 14 by pressure acting on the seat to urge it into contact with the closure member 16. It should be noticed that the seat 14 includes end 26 that, in this embodiment, is protected from flow erosion by recess 28 in seal adapter 24.

The deflection of the seat 14 becomes important to functionality in that the seal adapter 24 provides pressure communication passageways 30 that extend from an upstream pressure source 32 to a back surface 34 of the seat 14. The pressure communication passageways 30 cause an increase in contact force between the closure member 16 and the seat 14 to seal against pressure. Because of the pressure induced deflection, the required spring 20 preset value is substantially lower than it would have had to be in a prior art seat that is not configured with a thin wall for flexibility and having a back surface 34 exposed to the upstream pressure source. The reduction in preset value is related to the flexion of the seat such that an equivalent cracking pressure is achieved through the sealing impetus of both the spring preset and the flexion as opposed to prior art devices where the cracking pressure is achieved solely by the spring preset. The reduction in required spring preset value improves longevity of the valve 10.

Figure 2:
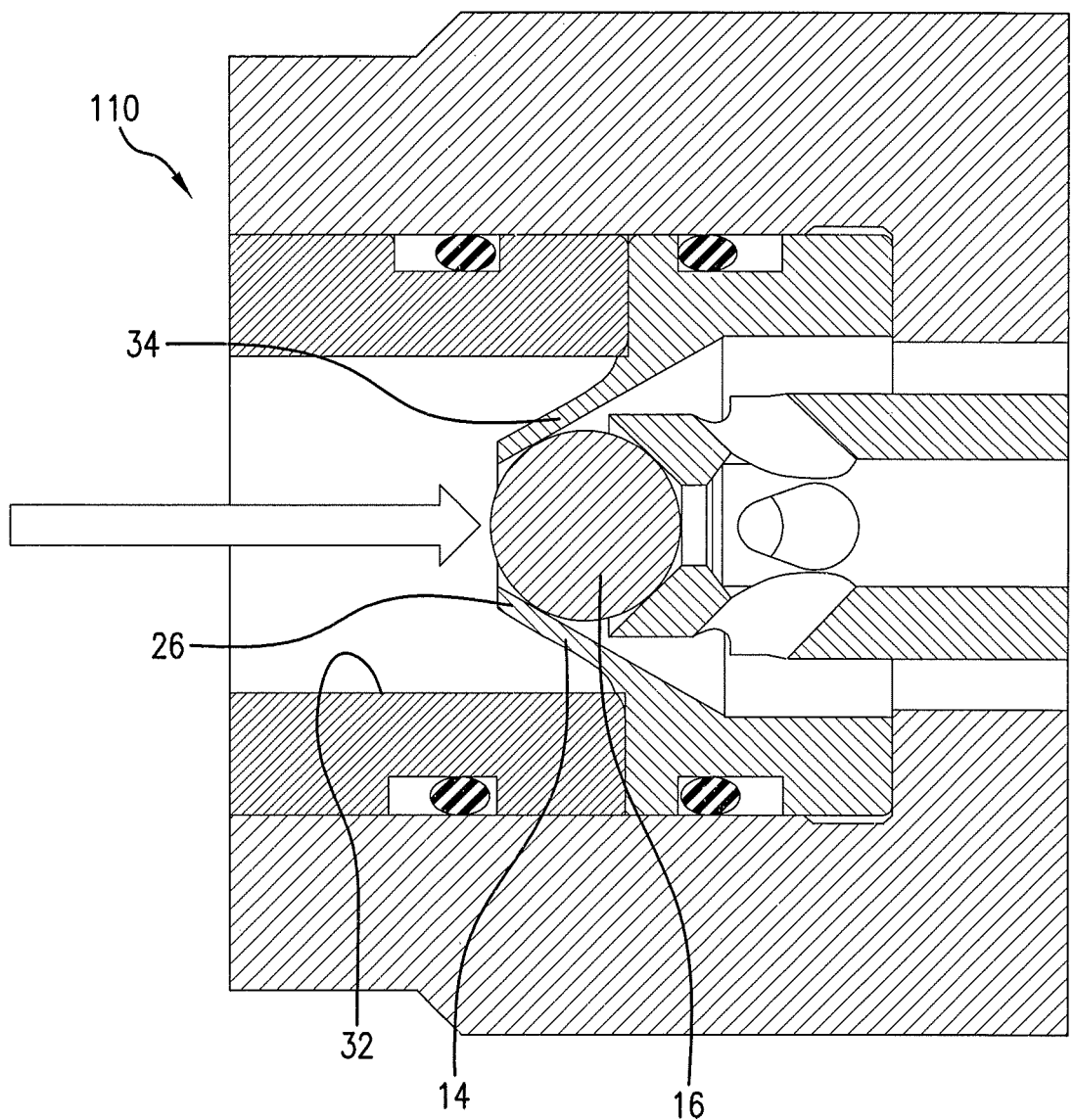
FIG. 2 is a cross sectional view of an alternate embodiment of a pressurized seat check valve as disclosed herein.

In an alternate embodiment, referring to FIG. 2, it will be apparent to one having just read the foregoing that the seal adapter 24 is missing from this embodiment. Instead, the pressure source is open all the way to the seal sub 12. It will also be appreciated that the seat 14 has not changed. Accordingly, pressure from the source 32 on the back surface 34 of the seat 14 has the same function and result as in the embodiment of FIG. 1. This embodiment will not protect the seat end 26 from erosion but does effectively reduce required spring force and hence provides a benefit in valve 110 longevity similar to valve 10.

Figure 3:
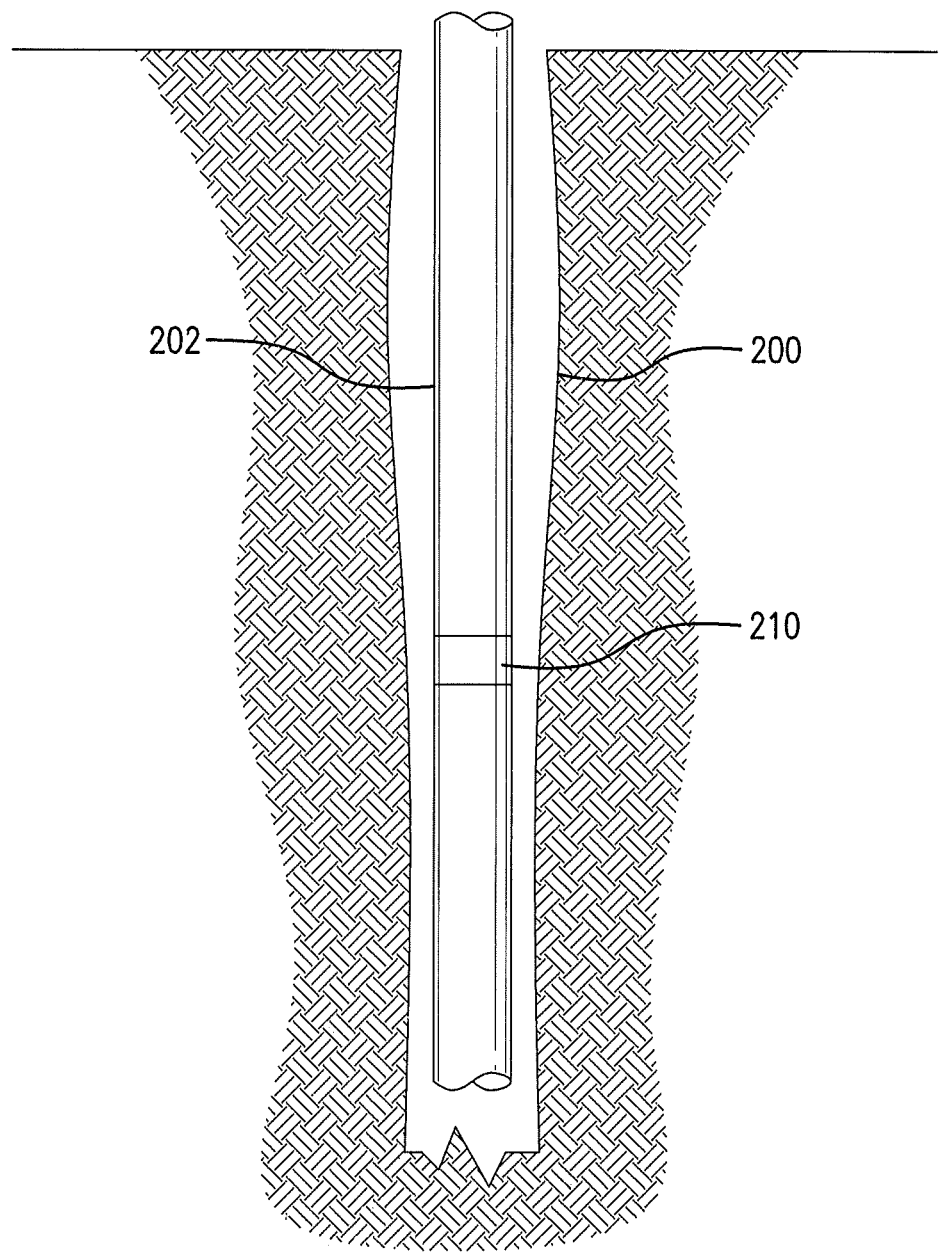
FIG. 3 is a schematic view of a borehole with a tubing string and the valve as disclosed herein.

Referring to FIG. 3, a borehole system is illustrated including a borehole 200 having a tubing string 202 and a valve 210 as disclosed herein schematically represented.

Set forth below are some embodiments of the foregoing disclosure:

Embodiment 1

A pressurized seat check valve including a flexible frustoconical seat having a back surface configured for exposure to upstream pressure, a closure member in sealable communication with the seat, the closure member being biased into contact with the seat and, in use, the seat being deflected toward the closure member by the exposure to upstream pressure.

Embodiment 2

The valve as in any prior embodiment further including a seal adapter configured with a pressure communication passageway.

Embodiment 3

The valve as in any prior embodiment wherein the pressure passageway is a plurality of pressure communication passageways.

Embodiment 4

The valve as in any prior embodiment wherein the pressure passageways port pressure from a pressure source to the back surface of the seat.

Embodiment 5

The valve as in any prior embodiment wherein the seal adapter includes a recess protective of the seat from flow erosion.

Embodiment 6

The valve as in any prior embodiment wherein the seat is metal.

Embodiment 7

The valve as in any prior embodiment wherein the seat is polymeric.

Embodiment 8

The valve as in any prior embodiment wherein the closure member is biased by a spring.

Embodiment 9

The valve as in any prior embodiment wherein the spring preset force is reducible during manufacture by an amount related to the anticipated flexion of the seat from upstream pressure, in use.

Embodiment 10

The valve as in any prior embodiment wherein the closure member is a ball.

Embodiment 11

The valve as in any prior embodiment wherein the closure member is a dart.

Embodiment 12

A downhole system including a borehole, a tubing string within the borehole, the string including the pressurized seat check valve as in any prior embodiment.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A pressurized seat check valve comprising:
a flexible frustoconical seat having a back surface configured for exposure to upstream pressure;
a closure member being biased into sealable contact with the seat and, in use, the seat being deflected toward the closure member by the exposure to upstream pressure, the closure member being pushed off the seat upon upstream pressure exceeding a cracking pressure of the valve.

2. The valve as claimed in claim 1 further including a seal adapter configured with a pressure communication passageway.

3. The valve as claimed in claim 2 wherein the pressure passageway is a plurality of pressure communication passageways.

4. The valve as claimed in claim 2 wherein the pressure passageways port pressure from a pressure source to the back surface of the seat.

5. The valve as claimed in claim 2 wherein the seal adapter includes a recess protective of the seat from flow erosion.

6. The valve as claimed in claim 1 wherein the seat is metal.

7. The valve as claimed in claim 1 wherein the seat is polymeric.

8. The valve as claimed in claim 1 wherein the closure member is biased by a spring.

9. The valve as claimed in claim 1 wherein the check valve further comprises a spring bearing against the closure member, the spring having a spring preset force related to as anticipated flexion of the seat from upstream pressure, in use.

10. The valve as claimed in claim 1 wherein the closure member is a ball.

11. The valve as claimed in claim 1 wherein the closure member is a dart.

12. A downhole system comprising:
   a borehole;
   a tubing string within the borehole, the string including the pressurized seat check valve as claimed in claim 1.

* * * * *